US012647234B2

(12) United States Patent (10) Patent No.: US 12,647,234 B2
Liu et al. (45) Date of Patent: Jun. 2, 2026

(54) PORT INDICATION INFORMATION REPORTING METHOD AND TERMINAL

(71) Applicant: DATANG MOBILE COMMUNICATIONS EQUIPMENT CO., LTD., Beijing (CN)

(72) Inventors: Zhengxuan Liu, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 294 days.

(21) Appl. No.: 18/283,202

(22) PCT Filed: Mar. 15, 2022

(86) PCT No.: PCT/CN2022/080924
§ 371 (c)(1),
(2) Date: Sep. 20, 2023

(87) PCT Pub. No.: WO2022/206371
PCT Pub. Date: Oct. 6, 2022

(65) Prior Publication Data
US 2024/0171345 A1 May 23, 2024

(30) Foreign Application Priority Data
Apr. 2, 2021 (CN) .......................... 202110362882.6

(51) Int. Cl.
*H04L 5/00* (2006.01)
(52) U.S. Cl.
CPC .................................. *H04L 5/0051* (2013.01)
(58) Field of Classification Search
CPC ... H04B 7/0626; H04B 7/0632; H04W 72/21; H04W 72/23; H04W 72/542; H04L 1/0026
See application file for complete search history.

(56) References Cited

U.S. PATENT DOCUMENTS

| | | | | |
|---|---|---|---|---|
| 11,930,517 | B2 * | 3/2024 | Zhou ..................... | H04L 5/0044 |
| 2014/0086285 | A1 * | 3/2014 | Yang .................... | H04B 7/0417 |
| | | | | 375/219 |

(Continued)

FOREIGN PATENT DOCUMENTS

| | | |
|---|---|---|
| CN | 104885499 A | 9/2015 |
| CN | 107204794 A | 9/2017 |

(Continued)

OTHER PUBLICATIONS

International Search Report for International Patent Application No. PCT/CN2022/080924 issued by the International Patent Office on May 30, 2022 and its English translation provided by WIPO.

(Continued)

*Primary Examiner* — Romani Ohri
(74) *Attorney, Agent, or Firm* — Ladas & Parry, LLP

(57) ABSTRACT

A port indication information reporting method and terminal are provided. The port indication information reporting method for the terminal includes: receiving a CSI-RS resource issued by a network side device, the CSI-RS resource including a plurality of CSI-RS ports; selecting a plurality of target CSI-RS ports in the plurality of CSI-RS ports; and reporting port selection indication information to the network side device, the port selection indication information being used to indicate a port identifier of the target CSI-RS port. According to the present application, it is able for the network side device to determine the CSI-RS ports selected by the terminal in accordance with the port indication information that is reported.

17 Claims, 1 Drawing Sheet receiving a CSI-RS resource issued by a network side device, the CSI-RS resource including a plurality of CSI-RS ports — 101 selecting a plurality of target CSI-RS ports in the plurality of CSI-RS ports — 102 reporting port selection indication information to the network side device, the port selection indication information being used to indicate a port identifier of the target CSI-RS port — 103

(56) References Cited

U.S. PATENT DOCUMENTS

| | | | |
|---|---|---|---|
| 2014/0192917 A1 | 7/2014 | Nam et al. | |
| 2018/0212662 A1* | 7/2018 | Ren | H04B 7/0479 |
| 2019/0089437 A1* | 3/2019 | Chen | H04B 7/0456 |
| 2019/0260430 A1 | 8/2019 | Cai et al. | |
| 2020/0021413 A1 | 1/2020 | Park et al. | |
| 2020/0178096 A1* | 6/2020 | Chen | H04L 1/0026 |
| 2021/0099211 A1 | 4/2021 | Rahman et al. | |
| 2022/0015064 A1 | 1/2022 | Su et al. | |
| 2023/0093589 A1* | 3/2023 | Wu | H04B 7/0486 |
| | | | 375/267 |
| 2023/0170963 A1* | 6/2023 | Wu | H04B 7/0626 |
| | | | 370/329 |
| 2024/0048325 A1* | 2/2024 | Hao | H04L 5/005 |

FOREIGN PATENT DOCUMENTS

| | | | |
|---|---|---|---|
| CN | 107733476 A | 2/2018 | |
| CN | 113271133 A | 8/2021 | |
| JP | 2016507961 A | 3/2016 | |
| JP | 2019510419 A | 4/2019 | |
| JP | 2020534719 A | 11/2020 | |
| WO | 2016122257 A1 | 8/2016 | |
| WO | 2020063743 A | 4/2020 | |

OTHER PUBLICATIONS

Written Opinion for International Patent Application No. PCT/CN2022/080924 issued by the International Patent Office on May 30, 2022 and its English translation provided by WIPO.

International Preliminary Report on Patentability for International Patent Application No. PCT/CN2022/080924 issued by the International Patent Office on Oct. 3, 2023 and its English translation provided by WIPO.

"CSI enhancements for MTRP and FR1 FDD with partial reciprocity," 3GPP TSG RAN WG1 Meeting #103-e R1-2007830, e-Meeting, Oct. 26-Nov. 13, 2020, Source: CATT, Agenda Item: 8.1.4.

First Chinese Office Action and search report for the corresponding Chinese Patent Application No. 20210362882.6 issued by the Chinese Patent Office on May 25, 2023 and its English translation provided by the foreign associate.

Extended European Search Report issued on Jul. 23, 2024 for European Patent Application No. 22778555.7.

Office Action issued on Sep. 10, 2024 for Japanese Patent Application No. 2023-560613 and its English translation from Global Dossier.

* cited by examiner

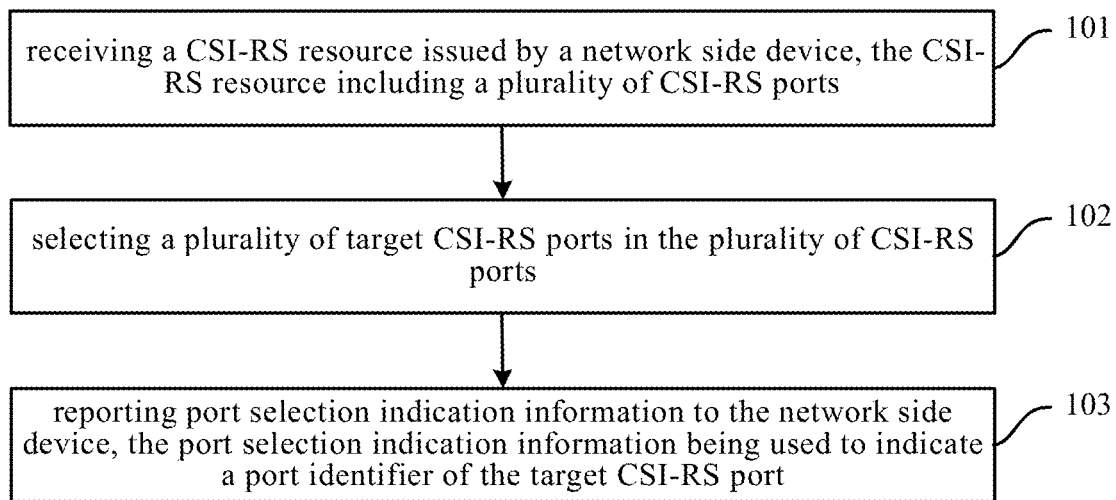

receiving a CSI-RS resource issued by a network side device, the CSI-RS resource including a plurality of CSI-RS ports ⟋ 101 selecting a plurality of target CSI-RS ports in the plurality of CSI-RS ports ⟋ 102 reporting port selection indication information to the network side device, the port selection indication information being used to indicate a port identifier of the target CSI-RS port ⟋ 103

Fig. 1

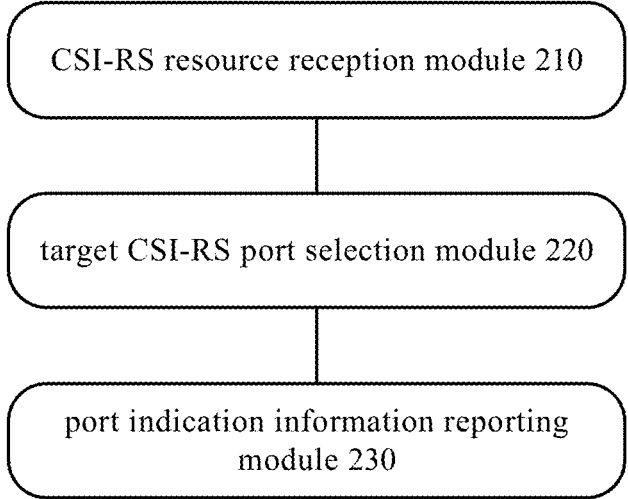

CSI-RS resource reception module 210 target CSI-RS port selection module 220 port indication information reporting module 230

Fig. 2

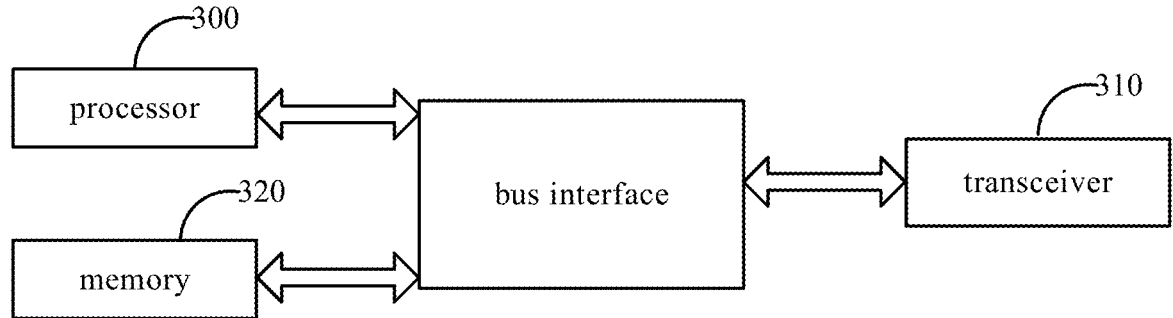

300 processor

320 memory bus interface

310 transceiver

Fig. 3

PORT INDICATION INFORMATION REPORTING METHOD AND TERMINAL

CROSS-REFERENCE TO RELATED APPLICATIONS

The present application is the U.S. national phase of PCT Application No. PCT/CN2022/080924 filed on Mar. 15, 2022, which claims priority to Chinese patent application No. 202110362882.6 entitled "port indication information reporting method and terminal" and filed with China National Intellectual Property Administration (CNIPA) on Apr. 2, 2021, the disclosures of which are incorporated herein by reference in their entireties.

TECHNICAL FIELD

The present application relates to the field of mobile communication technology, in particular to a port indication information reporting method and a terminal.

BACKGROUND

Along with the development of the mobile communication technology, a 5th-Generation (5G) mobile networks standard has been developed from Rel-15 to Rel-17.

Currently, in Rel-17, it follows a structure of a Rel-15 or Rel-16 Type II port selection codebook. For the Rel-15 or Rel-16 Type II port selection codebook, consecutive L ports are selected (L is a positive integer). In Rel-17, ports for a codebook may be selected freely, i.e., it is unnecessary to select consecutive L ports. Hence, a port selection indication method in Rel-15/16 cannot be used for the Rel-17 port selection codebook.

Hence, there is an urgent need to design a dedicated Rel-17 port selection codebook.

SUMMARY

An object of the present application is to provide a port indication information reporting method and a terminal, so as to achieve Rel-17 port selection.

In one aspect, the present application provides in some embodiments a port indication information reporting method for a terminal, including: receiving a Channel State Information Reference Signal (CSI-RS) resource issued by a network side device, the CSI-RS resource including a plurality of CSI-RS ports; selecting a plurality of target CSI-RS ports in the plurality of CSI-RS ports; and reporting port selection indication information to the network side device, the port selection indication information being used to indicate a port identifier of the target CSI-RS port.

In another aspect, the present application provides in some embodiments a terminal, including: a CSI-RS resource reception module configured to receive a CSI-RS resource issued by a network side device, the CSI-RS resource including a plurality of CSI-RS ports; a target CSI-RS port selection module configured to select a plurality of target CSI-RS ports in the plurality of CSI-RS ports; and a port indication information reporting module configured to report port selection indication information to the network side device, the port selection indication information being used to indicate a port identifier of the target CSI-RS port.

In yet another aspect, the present application provides in some embodiments a terminal, including a memory, a transceiver and a processor. The memory is configured to store therein a computer program. The transceiver is configured to transmit and receive data under the control of the processor. The transceiver is configured to receive a CSI-RS resource issued by a network side device, and the CSI-RS resource includes a plurality of CSI-RS ports. The processor is configured to read a computer program in the memory to select a plurality of target CSI-RS ports in the plurality of CSI-RS ports. The transceiver is further configured to report port selection indication information to the network side device, and the port selection indication information is used to indicate a port identifier of the target CSI-RS port.

In still yet another aspect, the present application provides in some embodiments an electronic apparatus, including a memory, a processor, and a computer program stored in the memory and executed by the processor. The processor is configured to execute the computer program to implement the above-mentioned port indication information reporting method.

In still yet another aspect, the present application provides in some embodiments a processor-readable storage medium storing therein a computer program. The computer program is used to be executed by a processor to implement the above-mentioned port indication information reporting method.

According to the embodiments of the present application, the terminal receives the CSI-RS resource issued by the network side device and including the plurality of CSI-RS ports, selects the plurality of target CSI-RS ports in the plurality of CSI-RS ports, and reports the port selection indication information to the network side device. The port selection indication information is used to indicate the port identifier of the target CSI-RS port. As a result, it is able for the network side device to determine the CSI-RS port selected by the terminal in accordance with the port identifier of the selected target CSI-RS port indicated through the reported port selection indication information.

The above description is merely an overview of the schemes in the embodiments of the present application, and the schemes may be implemented in accordance with contents involved in the description so as to enable a person skilled in the art to understand the technical means of the present application in a clearer manner. In order to make the objects, the technical solutions and the advantages of the present application more apparent, the present application will be described hereinafter in conjunction with the drawings and embodiments.

BRIEF DESCRIPTION OF THE DRAWINGS

FIG. 1 is a flow chart of a port indication information reporting method according to a first embodiment of the present application;

FIG. 2 is a block diagram of a terminal according to a second embodiment of the present application; and FIG. 3 is a block diagram of the terminal according to a third embodiment of the present application.

DETAILED DESCRIPTION

The expression "and/or" in the embodiments of the present application may be merely used to describe the relationship between objects, and it may include three relationships. For example, "A and/or B" may represent that, there is only A, there are both A and B, and there is only B. Further, the symbol "/" usually refers to "or".

The expression "a plurality of" refers to two or more, and the other quantifiers are similar.

The present application will be described hereinafter in a clear and complete manner in conjunction with the drawings and embodiments. Obviously, the following embodiments merely relate to a part of, rather than all of, the embodiments of the present application, and based on these embodiments, a person skilled in the art may, without any creative effort, obtain the other embodiments, which also fall within the scope of the present application.

An object of the present application is to provide a port indication information reporting method and a terminal, so as to enable an Integrated Access Backhaul (IAB) node to be switched between Central Units (CUs).

The method and the device are provided on the basis of a same inventive concept, and a principle of the method for solving the problem is similar to that of the device, so the implementation of the device may refer to that of the method.

Schemes in the embodiments of the present application may be applied to various systems, especially a 5G system, e.g., Global System of Mobile communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplexing (FDD) system, LTE Time Division Duplexing (TDD) system, Long Term Evolution Advanced (LTE-A) system, Universal Mobile Telecommunication System (UMTS), Worldwide Interoperability for Microwave Access (WiMAX) system, or 5th-Generation (5G) New Radio (NR) system. Each of these systems includes a terminal device and a network device. Each system further includes a core network part, e.g., an Evolved Packet System (EPS) or 5G system (5GS).

The terminal involved in the embodiments of the present application is a device for providing voice data and/or any other service data to a user, e.g., a handheld device having a wireless connection function, or any other processing device capable of being connected to a wireless modem. In different systems, the terminal device may have different names. For example, in a 5G system, the terminal device is called as User Equipment (terminal). A wireless terminal device communicates with one or more Core Networks (CNs) via a Radio Access Network (RAN). The wireless terminal device may be a mobile terminal, e.g., a mobile phone (or cellular phone), or a computer having the mobile terminal device, e.g., a portable, pocket-sized, handheld, built-in or vehicle-mounted mobile device, which are capable of exchanging voice and/or data with the RAN. For example, the wireless terminal device may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal device may also be called as system, subscriber unit, subscriber station, mobile station, mobile, remote station, remote terminal, access terminal, user terminal, user agent or user device, which will not be particularly defined herein.

The network device involved in the embodiments of the present application may be a base station which includes a plurality of cells providing services for the terminal. Depending on different application scenarios, the base station is called as an access point, a device in an access network in communication with the wireless terminal device through one or more sectors on an air interface, or any other name. The network device is used to exchange a received air frame with an Internet Protocol (IP) packet, and it serves as a router between the wireless terminal device and the other part of the access network. The other part of the access network includes an IP communication network. The network device may further coordinate attribute management on the air interface. For example, the network device involved in the embodiments of the present application is a Base Transceiver Station (BTS) in the GSM or CDMA system, a NodeB in the WCDMA system, an evolutional Node B (eNB, or e-NodeB) in the LTE system, a 5G base station (gNB) in 5G network architecture (next generation system), a Home evolved Node B (HeNB), a relay node, a femto, or a pico, which will not be particularly defined herein. In some network structures, the network device includes a Centralized Unit (CU) and a Distributed Unit (DU), which may be geographically separated from each other.

Multi Input Multi Output (MIMO) transmission is performed between the network device and the terminal each with one or more antennae, and the MIMO transmission is Single User MIMO (SU-MIMO) or Multiple User MIMO (MU-MIMO). Depending on the form of an antenna combination and the quantity of antennae, the MIMO transmission may be 2D-MIMO, 3D-MIMO, FD-MIMO or massive-MIMO, and it may also be diversity transmission, precoding transmission or beam-forming transmission.

Rel-15 and Rel-16 Type II port selection codebook in the prior art will be described hereinafter.

A Type II codebook has been defined in NR Rel-15. A Rank1 codebook and a Rank2 codebook are supported on the basis of linear combination of beams in an orthogonal beam group. For a sub-band, the Rank1 codebook is expressed as $$W = \begin{bmatrix} \tilde{w}_{0,0} \\ \tilde{w}_{1,0} \end{bmatrix},$$

and the Rank2 codebook is expressed as $$W = \begin{bmatrix} \tilde{w}_{0,0} & \tilde{w}_{0,1} \\ \tilde{w}_{1,0} & \tilde{w}_{1,1} \end{bmatrix},$$

where $$\tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i},$$

L represents the quantity of orthogonal beams in the group, $b_{k_1,k_2}$ represents an orthogonal beam and uses a two-dimensional (2D) Discrete Fourier Transform (DFT) vector, r=0,1 represents a first polarization direction and a second polarization direction in a dual-polarized antenna array, l=0,1 represents a layer, $$p_{r,l,i}^{(WB)}$$

represents a wideband amplitude coefficient acting on a beam i in the beam group, a polarization direction r and a layer l, $$p_{r,l,i}^{(SB)}$$

represents a sub-band amplitude coefficient acting on the beam i in the beam group, the polarization direction r and the layer l, and $c_{r,l,i}$ represents a sub-band phase coefficient acting on the beam i in the beam group, the polarization direction r and the layer l. The quantity of codebook coefficients for Rank=2 is about twice of the quantity of codebook coefficients for Rank=1, so there is a huge difference between codebook overheads when a Rank Indicator (RI) has different values. Upon the receipt of CSI from a terminal, it is impossible for a network side device to obtain the value of RI until the CSI is correctly decoded, so it is impossible for the network side device to determine a size of an overhead for the CSI. In order to prevent the network side device from decoding the CSI incorrectly due to a fuzzy overhead. In Rel-15, Type II CSI is reported in the following two parts.

A first part of the CSI, i.e., Part1, includes the RI, a wideband Channel Quality Indicator (CQI) corresponding to a first codeword, a differential CQI corresponding to the first codeword, the quantity of zero coefficients of layer 1, and the quantity of zero coefficients of layer 2; and a second part of the CSI, i.e., Part2, includes a rotation factor, beam indication information, a strongest beam indicator of layer 1, a wideband amplitude coefficient of layer 1, a strongest beam indicator of layer 2, a wideband amplitude coefficient of layer 2, a sub-band phase coefficient and/or a sub-band amplitude coefficient of an even-numbered sub-band, and a sub-band phase coefficient and/or a sub-band amplitude coefficient of an odd-numbered sub-band, as shown in the following table.

For Part1 of the CSI, its overhead is constant and independent of the value of RI. For Part2 of the CSI, its overhead may be determined in accordance with a result obtained after decoding Part1. In this way, it is able to prevent the occurrence of a fuzzy overhead.

Based on a design principle of a Rel-15 Type II codebook, a Rel-16 Type II codebook is also reported in two parts, i.e., Part1+Part2. An overhead for Part1 is determined in accordance with a configuration of the network side device, and an overhead for Part2 is determined in accordance with a value of an information field in Part1.

Part1 of the Rel-16 Type II codebook includes the following parameters: RI, wideband CQI, each sub-band CQI, and the total quantity of non-zero coefficients KNZ of all layers. Here, the overhead for Part1 does not change along with the value of RI. It should be appreciated that, the non-zero coefficient refers to a coefficient whose amplitude is not zero.

Depending on different discarding priority levels, Part2 of the Rel-16 Type II codebook includes three components, i.e., G0 (space-domain base vector indicator, rotation factor, and Strongest Coefficient Indicator (SCI) of each layer), G1 (frequency-domain base vector indicator, initial value Minitial indicator of an intermediate base vector set (N3>19), reference amplitude, high-priority non-zero coefficient, and non-zero coefficient position indicator corresponding to the high-priority non-zero coefficient), and G2 (low-priority non-zero coefficient and non-zero coefficient position indicator corresponding to the low-priority non-zero coefficient).

In Rel-15, merely the reporting of semi-persistent CSI including the Type II codebook Part1 is supported. Here, the reporting of Part1 is mainly used to monitor rank information about the Type II CSI, so as to provide a reference for the allocation of resources for the Type II codebook reported on the basis of a Physical Uplink Shared Channel (PUSCH). The Rel-16 Type II codebook has a relatively small overhead and it is unnecessary to provide splitting feedback, so the reporting of Part1 only of the Rel-16 type II codebook is not supported any more.

The Rel-15/16 Type II port selection codebook W1 is expressed as $$W_1 = \begin{bmatrix} E_{\frac{X}{2}*L} & 0 \\ 0 & E_{\frac{X}{2}*L} \end{bmatrix},$$

where X represents the quantity of CSI-RS ports, and $L \in \{2,4\}$ and it is a configurable parameter. Each port selection block is expressed as $$E_{\frac{X}{2}*L} = \left[ e_{mod\left(md, \frac{X}{2}\right)}^{\left(\frac{X}{2}\right)} e_{mod\left(md+1, \frac{X}{2}\right)}^{\left(\frac{X}{2}\right)} \cdots e_{mod\left(md+L, \frac{X}{2}\right)}^{\left(\frac{X}{2}\right)} \right],$$

where $$e_i^{\left(\frac{X}{2}\right)}$$

represents a vector having a length of $$\frac{X}{2},$$

an $i^{th}$ element is 1, the other elements are 0; a parameter m is used to select L consecutive ports, $$m \in \left\{ 0, 1, \ldots, \left[\frac{X}{2d}\right] - 1 \right\}$$

and wideband feedback is used; and a parameter $d \in \{1,2,3,4\}$ is configurable and needs to meet a condition $d \le L$, it is used to adjust a sampling distance for every L beams, and a feedback overhead is affected by this parameter. Here, it is equivalent to that X/2 ports are divided into X/2d groups, so as to reduce the feedback overhead for indicating m. A part for indicating m is reported in Part2.

First Embodiment

As shown in FIG. 1, the present application provides in this embodiment a port indication information reporting method for a terminal, which includes the following steps.

Step 101: receiving a CSI-RS resource issued by a network side device, the CSI-RS resource including a plurality of CSI-RS ports.

The method in the embodiments of the present application is applied to a scenario where non-consecutive CSI-RS ports are selected in Rel-17.

The CSI-RS is a signal for obtaining CSI.

The network side device selects the CSI-RS resource to be issued to the terminal, and transmits the beam-formed CSI-RS resource to the terminal through X CSI-RS ports (X is an integer greater than or equal to 1). The X CSI-RS ports refer to all of, or a part of, ports configured by the network side device for one CSI-RS resource or K CSI-RS resources (K is an integer greater than or equal to 1), or a part of ports for each of the K CSI-RS resources.

The issued CSI-RS resource includes a plurality of CSI-RS ports, and each CSI-RS port corresponds to one port identifier. During the implementation, the network side device may add a corresponding port identifier for each CSI-RS port in advance. For example, the ports for the K CSI-RS resources are indexed jointly, i.e., the plurality of CSI-RS resources are ranked, and then the ports for the CSI-RS resources are indexed in a descending or ascending order. For example, when index numbers of the ports for first and second CSI-RS resources are $P_1$ and $P_2$, index numbers of the ports for the two resources are $$n, n + P_1 - 1, n + P_1 + 1, \dots, n + P_1 + P_2 - 1,$$

where n represents an initial index number of the port for the first CSI-RS resource.

Upon the receipt of the CSI-RS resource issued by the network side device, the terminal performs Step S102.

Step S102: selecting a plurality of target CSI-RS ports in the plurality of CSI-RS ports.

The target CSI-RS port refers to a CSI-RS port selected by the terminal from the plurality of CSI-RS ports in the CSI-RS resource issued by the network side device, and the network side device transmits data to, or receives data from, the terminal subsequently through the target CSI-RS port. The plurality of target CSI-RS ports is non-consecutive.

Upon the receipt of the CSI-RS resource issued by the network side device, the terminal selects the plurality of target CSI-RS ports in the plurality of CSI-RS ports included in the CSI-RS resource. A specific selection mode depends on user's demands, which will not be further particularly defined herein.

After selecting the plurality of target CSI-RS ports in the plurality of CSI-RS ports, the terminal performs Step 103.

Step 103: reporting port selection indication information to the network side device, wherein the port selection indication information may be used to indicate a port identifier of the target CSI-RS port.

After selecting the plurality of target CSI-RS ports in the plurality of CSI-RS ports, the terminal determines the port selection indication information in accordance with the target CSI-RS ports, and reports the port selection indication information to the network side device. During the implementation, the port selection indication information may be carried in CSI for reporting, and the CSI may include a first part (i.e., part1) and a second part (i.e., part2). When the port selection indication information is reported, it is carried in part1 or part2 of the CSI, which will be described hereinafter.

In the embodiments of the present application, the terminal selects the target CSI-RS port randomly in the CSI-RS ports issued by the network side device, and indicates the port identifier of the target CSI-RS port in the reported port selection indication information, so that the network side device determines the CSI-RS port selected by the terminal.

In an optional embodiment of the present application, the reporting the port selection indication information to the network side device includes reporting the port selection indication information carried in the first part or the second part of the CSI to the network side device in accordance with an indication mode of the port selection indication information.

In the embodiments of the present application, the indication modes of the port selection indication information may include a bitmap indication mode and a combination number indication mode. Upon the receipt of the port selection indication information, whether the port selection indication information is reported through part1 or part2 of the CSI is determined in accordance with the indication mode of the port selection indication information, which will be described hereinafter.

There are the following circumstances for reporting the port selection indication information.

First Circumstance

In an optional embodiment of the present application, the reporting the port selection indication information to the network side device includes, in the case that the quantity of target CSI-RS ports is equal to the quantity of ports configured by the network side device, reporting the port selection indication information to the network side device through the first part or the second part of the CSI.

In the embodiments of the present application, when the quantity of transmission ports selected by the terminal is equal to the quantity of ports configured by the network side device, the port selection indication information is reported to the network side device through part1 or part2 of the CSI by one of two following manners.

1. When port selection is layer-common (i.e., the quantity of CSI-RS ports on each data transmission layer is the same) and the quantity of ports configured by the network side device for the terminal is $P_1$, indication information about the ports selected by the terminal (i.e., the port selection indication information) is indicated in a combination number indication mode or a bitmap indication mode having a size of p (i.e., ports selected in two polarization directions). At this time, the port selection indication information may be reported through part1 or part2 of the CSI.

2. When the port selection is layer-specific (i.e., the quantity of CSI-RS ports on each data transmission layer is different) and the quantity of ports configured by the network side device for the terminal is $P_1$, the indication information about the ports selected by the terminal (i.e., the port selection indication information) is indicated in a combination number indication mode or a bitmap indication mode having a size of p. At this time, the port selection indication information is reported through part1 or part2 of the CSI.

The combination number indication mode may be expressed as $$\left\lceil \log_2 \binom{P}{P_1} \right\rceil, \tag{1}$$

where $\lceil \ \rceil$ represents a rounding-up operation (the same below).

Optionally, the network side device may configure a same quantity $\bar{P}$ of ports at each data transmission layer for the terminal, and the quantity of data transmission layers is L (L is a positive integer), i.e.

$$\bar{P} = P_1 = P_2 = \dots = P_L.$$

For an $L^{th}$ layer, the indication information about the ports selected by the terminal is indicated in a combination number indication mode or a bitmap indication mode having a size of P. The port selection indication information is reported through part1 and part2 of the CSI.

Part1 further includes at least one of an RI, a wideband CQI, a CQI for each sub-band, the total quantity KNZ of non-zero coefficients for all layers, or the quantity of frequency-domain base vectors selected by the terminal. Part2 further includes at least one of an SCI for each layer, a frequency-domain base vector indictor, a reference amplitude, a non-zero coefficient, or a non-zero coefficient position indicator.

Second Circumstance

Optionally, the reporting the port selection indication information to the network side device through the first part or the second part of the CSI in accordance with the indication mode of the port selection indication information includes: in the case that the quantity of target CSI-RS ports is different from the quantity of ports configured by the network side device and the quantity of CSI-RS ports selected on each data transmission layer is the same, reporting the port selection indication information to the network side device through the first part of the CSI; or in the case that the quantity of target CSI-RS ports is different from the quantity of ports configured by the network side device, the indication mode of the port selection indication information is a combination number indication mode, and the quantity of CSI-RS ports selected on each data transmission layer is the same, reporting the port selection indication information through the second part and reporting the quantity of target ports through the first part to the network side device, the quantity of target ports being the quantity of target CSI-RS ports.

In the embodiments of the present application, in the case that the quantity of target CSI-RS ports is different from the quantity of ports configured by the network side device, i.e., the network side device has configured the quantity of CSI-RS ports for the terminal but the terminal fails to select the target CSI-RS ports in accordance with the quantity of CSI-RS ports configured by the network side device, there are the following two circumstances.

1. When the quantity of CSI-RS ports selected on each data transmission layer is the same, i.e., the port selection is layer-common, the port selection indication information may be reported through part1 of the CSI. In other words, the terminal reports combination number indication information or a bitmap having a size of $$\min\{\overline{P_1}, \overline{P_2}, \dots, \overline{P_L}\},$$

so as to indicate $\overline{P}$ ports selected from $$\min\{\overline{P_1}, \overline{P_2}, \dots, \overline{P_L}\}$$

ports. The combination number indication information is expressed as:

$$\left\lceil \log_2\left(\min\left\{\frac{\min(\overline{P_1}, \overline{P_2}, \dots \overline{P_L})}{\overline{P}}\right\}\right)\right\rceil. \quad (2)$$

2. When the quantity of CSI-RS ports selected on each data transmission layer is the same, i.e., the port selection is layer-common, and the indication mode of the port selection indication information is a combination number indication mode (i.e., bitmap), the port selection indication information is reported through part2 of the CSI, and the quantity of target ports is reported through part1 of the CSI. The quantity of target ports is the quantity of target CSI-RS ports.

Third Circumstance

Optionally, the reporting the port selection indication information to the network side device through the first part or the second part of the CSI in accordance with the indication mode of the port selection indication information includes: in the case that the quantity of target CSI-RS ports is different from the quantity of ports configured by the network side device, the quantities of CSI-RS Ports selected on each data transmission layer is different and the indication mode of the port selection indication information is a bitmap indication mode, reporting the port selection indication information to the network side device through the first part of the CSI; or in the case that the quantity of target CSI-RS ports is equal to the quantity of ports configured by the network side device, the quantity of CSI-RS ports selected on each data transmission layer is the same and the indication mode of the port selection indication information is a combination number indication mode, reporting the port selection indication information to the network side device through the first part of the CSI; or in the case that the quantity of target CSI-RS ports is different from the quantity of ports configured by the network side device, the quantity of CSI-RS ports on all the data transmission layers are different and the indication mode of the port selection indication information is a combination number indication mode, reporting the port selection indication information to the network side device through the first part of the CSI, and reporting the quantity of target ports to the network side device through the second part of the CSI.

In the embodiments of the present application, when the quantity of target CSI-RS ports is different from the quantity of ports configured by the network side device (i.e., the terminal fails to select the ports in accordance with the quantity of ports configured by the network side device), the quantity of CSI-RS ports selected on each data transmission layer is different (i.e., the port selection is layer-specific) and the indication mode of the port selection indication information is a bitmap indication mode, the port selection indication information is reported through part1 of the CSI.

When the quantity of target CSI-RS ports is equal to the quantity of ports configured by the network side device, the port selection is layer-common and the indication mode of the port selection indication information is a combination number indication mode, the port selection indication information may be reported through part1 of the CSI.

When the quantity of target CSI-RS ports is different from the quantity of ports configured by the network side device, the port selection is layer-specific and the indication mode of the port selection indication information is a combination number indication mode, the port selection indication information may be reported through part1 of the CSI and the quantity of target ports may be reported through part2 of the CSI.

The above circumstances will be described hereinafter in more details in conjunction with a specific example.

The network side device configures for or indicates to the terminal the quantity of ports $$\bar{P}_1 \le P$$

for transmitting beam-formed CSI-RSs at a first layer, and $\bar{P}_1$ ports for transmitting the beam-formed CSI-RSs at each layer are a part of, or all of, the P ports. The terminal reports the selected quantity of ports.

1. The port selection is layer-common. The terminal reports a bitmap having a size of $$\min\{\bar{P}_1, \bar{P}_2, \dots, \bar{P}_L\}$$

or combination number indication information to indicate P' ports selected from $$\min\{\bar{P}_1, \bar{P}_2, \dots, \bar{P}_L\}$$

ports. The port selection indication information indicated through bitmap may be reported through Part1. Optionally, the port selection indication information may be reported through Part2, and indication information having $$\lceil \log_2(\min\{\bar{P}_1, \bar{P}_2, \dots, \bar{P}_L\}) \rceil$$

bits is reported through Part1 to indicate the quantity P' of selected ports.

2. The port selection is layer-specific. For the first layer, the terminal reports a bitmap having a size of $\bar{P}_1$ or combination number indication information to indicate $$P'_l$$

ports selected from the $\bar{P}_1$ ports. Optionally, the network side device configures for the terminal to select a same quantity $\bar{P}'$ of ports at each layer, $$\bar{P}' = P'_1 = P'_2 = \dots = P'_L.$$

A bitmap having size of $\bar{P}_1$ or combination number indication information is used as the indication information about the ports selected by the terminal, so as to indicate the ports selected by the terminal at a first transmission layer. Optionally, the network side device configures for the terminal to select a same quantity $\bar{P}_1$ of ports at the first layer. A bitmap having a size of $\bar{P}_1$ or combination number indication information may be used as the indication information about the ports selected by the terminal, so as to indicate the ports selected by the terminal for the first transmission layer.

When the port selection is indicated through bitmap, the port selection indication information is reported through Part1. Optionally, when the port selection is indicated through a combination number and the network side has configured for the terminal to select a same quantity $\bar{P}'$ of ports at each layer, the port selection indication information is reported through Part1 or Part2. Optionally, when the port selection is indicated through a combination number, the port selection indication information is reported through Part2, and indication information having $$\lceil \log_2(\bar{P}_1) \rceil$$

bits is reported through Part1 to indicate the quantity $\bar{P}'$ of ports selected at the first layer. Optionally, when the quantity of ports selected at an individual layer or all layers is configured by the network side device, the port selection indication information may be reported through Part2. Optionally, the port selection indication information is reported through Part2, and indication information about the quantity of ports selected at an individual layer or all layers is reported through Part1. Optionally, indication information having $L \times \lceil \log_2(P) \rceil$ bits is reported through Part1 to indicate the total quantity of ports selected at L layers, and indication information having $L \times P$ bits is reported through Part2 to indicate port selection and/or non-zero coefficient positions at the L layers.

It is presumed that K CSI-RS resources are indexed independently, and the terminal reports a bitmap having a size of $$\sum_k P_k, k = 1, \dots, k$$

or combination number indication information to determine the ports selected by the terminal on a $k^{th}$ resource, where $$P'_k$$

represents the quantity of ports selected on the $k^{th}$ resource. The port selection indication information is used to indicate the port selection at all the transmission layers, or the port selection merely at one transmission layer.

When the bitmap is used to indicate the port selection, the port selection indication information $$\sum_k P_k \text{ or } \sum_k P_k$$

may be reported through Part1. When the quantity of the selected ports is configured by the network side device, the port selection indication information may also be reported through Part2. When the quantity of the selected ports is reported by the terminal, indication information having $$\lceil \log_2\left(\sum_k P_k\right) \rceil \text{ or } L^* \lceil \log_2\left(\sum_k P_k\right) \rceil$$

bits needs to be reported through Part1 to indicate the quantity of ports selected by the terminal at all layers or each layer.

Optionally, when the network side device has configured the quantity of ports selected on each resource and indicated the quantity of ports through a combination number, the port selection indication information $$\sum_{k} \lceil \log_2(P_k) \rceil \ \text{or} \ L^* \sum_{k} \lceil \log_2(P_k) \rceil$$

may be reported through Part1. When the quantity of the selected ports is configured by the network side device, the port selection indication information may be reported through Part2. When the quantity of the selected ports is reported by the terminal, indication information having $$\left\lceil \log_2 \left( \sum_{k} P_k \right) \right\rceil \ \text{or} \ L^* \left\lceil \log_2 \left( \sum_{k} P_k \right) \right\rceil$$

bits needs to be reported through Part1 to indicate the quantity of ports selected by the terminal at all layers or each layer.

Fourth Circumstance

In an optional embodiment of the present application, the reporting the port selection indication information to the network side device includes: in the case that the quantity of CSI-RS ports selected on each data transmission layer is the same, reporting the port selection indication information to the network side device through the first part of the CSI; or in the case that the quantity of CSI-RS ports selected on each data transmission layer is the same, reporting the port selection indication information to the network side device through the second part of the CSI, and reporting the quantity of target ports to the network side device through the first part of the CSI.

In the embodiments of the present application, when the quantity of CSI-RS ports fails to be configured by the network side device for the terminal, there are the following two circumstances.

1. When the port selection is layer-common, the port selection indication information may be reported through part1 of the CSI.

2. When the port selection is layer-common, the port selection indication information may be reported through part2 of the CSI, and the quantity of target ports may be reported through part2 of the CSI.

Fifth Circumstance

Optionally, the reporting the port selection indication information to the network side device includes: in the case that the quantity of CSI-RS ports selected on each data transmission layer is different and the indication mode of the port selection indication information is a bitmap indication mode, reporting the port selection indication information to the network side device through the first part of the CSI; or in the case that the quantity of CSI-RS ports selected on each data transmission layer is different and the indication mode of the port selection indication information is a combination number indication mode, reporting the port selection indication information to the network side device through the second part of the CSI, and reporting the quantity of target ports to the network side device through the first part of the CSI. The quantity of target ports is the quantity of target CSI-RS ports.

In the embodiments of the present application, when the port selection is layer-specific and the port indication mode is bitmap, the port selection indication information may be reported through part1 of the CSI.

When the port selection is layer-specific and the port indication mode is a combination number indication mode, the port selection indication information may be reported through part2 of the CSI, and the quantity of target ports may be reported through part1 of the CSI.

The reporting, by the terminal, the quantity of the selected ports will be described hereinafter in more details in conjunction with a specific example.

The network side device fails to configure the quantity of selected ports, and the terminal reports the quantity of the selected target CSI-RS ports. 1) When the port selection is layer-common, the terminal reports a bitmap having a size of P or combination number indication information to indicate P' ports selected from the P ports, and the port selection indication information is reported through Part1. Optionally, the port selection indication information is reported through Part2, and indication information having $\lceil \log_2(P) \rceil$ bits is reported through Part1 to indicate the quantity P' of the selected ports. 2) When the port selection is layer-specific, for the first layer, the terminal reports a bitmap having a size of P or combination number indication information to indicate $P_1$ ports selected from the P ports. Optionally, the network side device configures for the terminal to select a same quantity P' of ports at each layer, i.e., $P'=P_1=P_2= \ldots = P_L$. A bitmap having a size of P or combination number indication information is used as the indication information about the ports selected by the terminal, so as to indicate the ports selected by the terminal for the first transmission layer.

When the port selection is indicated through bitmap, the port selection indication information is reported through Part1. When the port selection indication information is indicated through a combination number and the network side device has configured for the terminal to select a same quantity P' of ports at each layer, the port selection indication information is reported through Part1 or Part2. Optionally, when the port selection is indicated through a combination number, the port selection indication information is reported through Part2, and indication information having $\lceil \log_2(P) \rceil$ bits is reported through Part1 to indicate the quantity $P_1$ of ports selected at each layer.

In the embodiments of the present application, the reporting of the port selection indication information will be described hereinafter in more details when the target CSI-RS ports belong to different CSI-RSs.

Optionally, when the plurality of target CSI-RS ports belongs to at least two CSI-RS resources, the reporting the port selection indication information to the network side device includes reporting the port selection indication information and resource indication information to the network side device. The resource indication information is used to indicate a CSI-RS resource to which the target CSI-RS port belongs.

In the embodiments of the present application, the resource indication information (CRI) is used to indicate a CSI-RS resource to which the target CSI-RS port belongs.

When the plurality of target CSI-RS ports belongs to at least two CSI-RS resources, the port selection indication information and the resource indication information need to be reported to the network side device, so as to notify the network side device of a specific port selected by the terminal and a CSI-RS resource to which the selected port belongs.

A reporting way will be described hereinafter in details in conjunction with the embodiments.

Optionally, the reporting the port selection indication information and/or the resource indication information to the network side device includes: in the case that the CSI is reported through a configured piece of CSI reporting, reporting the resource indication information to the network side device through a third part of the CSI, and reporting the port selection indication information to the network side device through the first part or the second part of the CSI; or in the case that the CSI is reported through at least two configured pieces of CSI reporting, reporting the resource indication information to the network side device through CSI for one piece of the CSI report, and reporting the port selection indication information to the network side device through a first part or a second part of the CSI for another piece of the CSI reporting.

In the embodiments of the present application, in the case that the CSI is reported through a configured piece of CSI reporting, the resource indication information is reported through the third part of the CSI (i.e., part0), and the port selection indication information is reported through part1 or part2 of the CSI.

In the case that the CSI is reported through at least two configured pieces of CSI reporting, the resource indication information is reported through CSI for one piece of CSI reporting, and the port selection indication information is reported through part1 or part2 of the CSI for another piece of the CSI reporting.

To be specific, when the CRI and the port selection indication information are reported through one piece of CSI reporting, the CSI is divided into three parts, i.e., Part0, Part1 and Part2, and the CRI is reported through Part0. The port selection is determined completely in accordance with the CRI, or determined in accordance with the port selection indication information reported through Part1 and/or Part2. In other words, the port selection may be determined as follows: (1) the port selection indication information is not reported any more and the quantity of ports selected by the terminal is the total quantity of ports on the resources indicated through the CRI; and (2) the port selection indication information is reported through Part1 and/or Part2.

the network side device to determine the CSI-RS port selected by the terminal in accordance with the port identifier of the target CSI-RS port indicated through the reported port selection indication information.

The above port selection will be described hereinafter in more details in conjunction with three examples.

First Example: Port Selection Indication

It is presumed that a base station has configured for the terminal a CSI-RS resource including X=32 ports, or configured for the terminal K=2 CSI-RS resources including 32 ports totally. It is further presumed that the quantities of ports selected in two polarization directions are the same, i.e., P=X/2=16, and the quantity L of data transmission layers is 2. When K=2, IDs of the two CSI-RS resources are 10 and 20 respectively and the quantities of ports for the two CSI-RS resources are 24 and 8 respectively, the two CSI-RS resources are ranked, the CSI-RS resource having an ID of 10 is used as a first CSI-RS resource and the CSI-RS resource having an ID of 20 is used as a second CSI-RS resource. When an initial value of the ports for the first resource is n=3000, the ports for the two resources are jointly indexed as 3000, . . . , 3023, 3024, . . . , 3031.

First circumstance: when the network side device configures P'=12 for the terminal, i.e., the terminal is indicated to select 12 ports in one polarization direction (i.e., positions of the selected CSI-RS ports are the same in two polarization directions of an antenna), the ports selected by the terminal is indicated through a bitmap having a size of 16 bits, e.g., in a polarization direction indicated in a first row in Table 1. In Table 1, each bit corresponds to one port, where "1" represents that the port is selected by the terminal, and "0" represents that the port is not selected by the terminal. At this time, the port selection indication in the other polarization direction is the same as that in the first polarization direction, and the port selection indication does not need to be reported.

TABLE 1

| bitmap indication for port selection | | | | | | | | | | | | | | | | |
|---|---|---|---|---|---|---|---|---|---|---|---|---|---|---|---|---|
| port indication in a first polarization direction | 1 | 0 | 1 | 1 | 1 | 1 | 0 | 0 | 1 | 1 | 1 | 1 | 0 | 1 | 1 | 1 |
| port indication in a second polarization direction | 1 | 0 | 1 | 1 | 1 | 1 | 0 | 0 | 1 | 1 | 1 | 1 | 0 | 1 | 1 | 1 |

The description about the ways of reporting the port selection indication information may refer to those mentioned in the first to fifth circumstances, which will thus not be further particularly defined herein.

In the embodiments of the present application, the CSI-RS resource corresponds to an interface of an antenna. The port selection indication information is further used to indicate the target CSI-RS port in a same polarization direction, i.e., a position where a target CSI-RS port is located in a polarization direction is the same as a position where another target CSI-RS port is located in the same polarization direction.

In a word, in the embodiments of the present application, the terminal receives the CSI-RS resource including the plurality of CSI-RS ports and issued by the network side device, selects the plurality of target CSI-RS ports from the plurality of CSI-RS ports, and reports the port selection indication information to the network side device. The port selection indication information is used to indicate the port identifier of the target CSI-RS port. As a result, it is able for Alternatively, the selected ports are indicated through a combination number having a size of bits of the following equation (3). The port selection indication information is reported through Part1 or Part2.

$$\left\lceil \log_2 \binom{16}{12} \right\rceil = 11 \tag{3}$$

The 11-bit indication information is used to indicate not only the port selection indication information in the first polarization direction but also the port selection indication information in the second polarization direction.

When the port selection is layer-common, the port selection indication information indicates the portion selection at the two layers.

When the port selection is layer-specific and the port selection indication is indicated through a bitmap, Tables 2 and 3 show the bitmap indication for the port selection at a first layer and a second layer respectively.

TABLE 2

| bitmap indication for port selection at first layer | | | | | | | | | | | | | | | |
|---|---|---|---|---|---|---|---|---|---|---|---|---|---|---|---|
| 1 | 1 | 1 | 1 | 1 | 1 | 0 | 0 | 1 | 1 | 1 | 1 | 1 | 0 | 0 | 1 |

TABLE 3

| bitmap indication for port selection at second layer | | | | | | | | | | | | | | | |
|---|---|---|---|---|---|---|---|---|---|---|---|---|---|---|---|
| 1 | 0 | 1 | 0 | 1 | 1 | 1 | 0 | 1 | 1 | 0 | 1 | 1 | 1 | 1 | 1 |

The port selection indication information having L*P=32 bits or $$L*\left\lceil \log_2\left(\frac{16}{12}\right)\right\rceil = 22$$

bits is reported through Part1 or Part2.

Second circumstance: when the quantity P' of ports reported by the terminal is 12 and the port selection is indicated through a bitmap (like that in Table 1), the port selection indication information is reported through Part1. When the port selection indication information is reported through Part2, indication information having $\lceil \log_2(P)\rceil$=4 bits needs to be reported through Part1 to indicate the quantity of ports selected by the terminal. When the port selection is indicated through a combination number, the port selection indication information may only be reported through Part2, and indication information having $\lceil \log_2(P)\rceil$=4 bits is reported through Part1 to indicate the quantity of ports selected by the terminal.

When the port selection is layer-common or layer-specific and indicated through a bitmap or a combination number, the port selection indication information is reported through Part2, the quantity of ports selected by the terminal is reported through Part1, and for layer-specific, it is presumed that $$P_1' = 12$$

ports are selected at the first layer and $$P_2' = 8$$

ports are selected at the second layer, Table 4 shows sizes of the port selection indication information in different port selection modes.

TABLE 4

| reporting of port indication information in different port selection modes | | |
|---|---|---|
| port selection mode/ port selection reporting | Part1 (bits) | Part2 (bits) |
| Layer-common/ bitmap indication | $\lceil \log_2 (P)\rceil = 4$ | $P = 16$ |
| Layer-specific/ bitmap indication | $L*\lceil \log_2 (P)\rceil = 8$ | $2*P = 32$ |
| Layer-common/ combination number indication | $\lceil \log_2 (P)\rceil = 4$ | $\left\lceil \log_2\binom{P}{P'}\right\rceil = 11$ |
| Layer-specific/ combination number indication | $L*\lceil \log_2 (P)\rceil = 8$ | $\left\lceil \log_2\binom{P}{P_1'}\right\rceil + \left\lceil \log_2\binom{P}{P_2'}\right\rceil = 25$ |

Third circumstance: when the quantities of beam-formed ports configured by the network side device for the terminal are $\overline{P}_1$=14 and $\overline{P}_2$=10 at the first layer and the second layer respectively and the terminal selects P'=8 ports at each layer, Table 5 shows sizes of the port indication information in different port selection modes.

TABLE 5

| reporting of port indication information in different port selection modes, with the quantity of ports being reported by terminal | | |
|---|---|---|
| port selection mode/port selection reporting | Part1 (bits) | Part2 (bits) |
| Layer-common/bitmap indication | $\min\{\overline{P}_1, \overline{P}_2\} = 10$ | N/A |
| Layer-specific/bitmap indication | $P_1 + P_2 = 24$ | N/A |
| Layer-common/bitmap indication | $\lceil \log_2 (\min\{\overline{P}_1, \overline{P}_2\})\rceil = 4$ | $\min\{\overline{P}_1, \overline{P}_2\} = 10$ |
| Layer-specific/bitmap indication | $\lceil \log_2 (\overline{P}_1)\rceil + \lceil \log_2 (\overline{P}_2)\rceil = 8$ | $P_1 + P_2 = 24$ |

TABLE 5-continued

| reporting of port indication information in different port selection modes, with the quantity of ports being reported by terminal | | |
|---|---|---|
| port selection mode/port selection reporting | Part1 (bits) | Part2 (bits) |
| Layer-common/combination number indication | $\lceil \log_2 (\min\{\overline{P}_1, \overline{P}_2\}) \rceil = 4$ | $\left\lceil \log_2 \left( \dfrac{\min\{\overline{P}_1, \overline{P}_2\}}{P'} \right) \right\rceil = 6$ |
| Layer-specific/combination number indication | $\lceil \log_2 (\overline{P}_1) \rceil + \lceil \log_2 (\overline{P}_2) \rceil = 8$ | |

When the quantity of ports selected by the terminal is configured by the network side device and the quantity P' of ports is 8, Table 6 shows sizes of port indication information in different port selection modes.

TABLE 6

| reporting of port indication information in different port selection modes, with the quantity of ports being configured by network side device | | |
|---|---|---|
| port selection mode/ port selection reporting | Part1 (bits) | Part2 (bits) |
| Layer-common/bitmap indication | $\min\{\overline{P}_1, \overline{P}_2\} = 10$ | N/A |
| Layer-specific/bitmap indication | $P_1 + P_2 = 24$ | N/A |
| Layer-common/bitmap indication | N/A | $\min\{\overline{P}_1, \overline{P}_2\} = 10$ |
| Layer-specific/bitmap indication | N/A | $P_1 + P_2 = 24$ |
| Layer-common/bitmap indication | N/A | $\min\{\overline{P}_1, \overline{P}_2\} = 10$ |
| Layer-specific/bitmap indication | N/A | $P_1 + P_2 = 24$ |
| Layer-common/combination number indication | N/A | $\left\lceil \log_2 \left( \dfrac{\min\{\overline{P}_1, \overline{P}_2\}}{P'} \right) \right\rceil = 6$ |
| Layer-specific/combination number indication | N/A | $\left\lceil \log_2 \left( \dfrac{\overline{P}_1}{P'} \right) \right\rceil + \left\lceil \log_2 \left( \dfrac{\overline{P}_2}{P'} \right) \right\rceil = 18$ |

Second Example: port selection indication, where K=2 resources are configured, and indexed independently, and the quantity L of transmission layers is 2.

IDs of the K=2 CSI-RS resources configured by the network side device are 10 and 20 respectively, the quantity of ports corresponding to the CSI-RS resources are $P_1=24$ and $P_2=8$ respectively, and the ports for the two resources are indexed as 3000, . . . , 3023 and 3000, . . . , 3007 respectively. When the port selection is indicated through a bitmap, an indication method is the same as that mentioned in the first example. When the port selection is indicated through a combination number, different from that in the first example, the indication information is reported independently with respect to each resource, so as to indicate the ports selected on the resource. When the quantity of ports selected on each resource is not configured by the network side device and it is indicated through a combination number, the port selection indication information may only be reported through Part2, and the quantity of ports selected on each resource is reported through Part1. When the ports at each layer are selected separately, the quantity of ports selected on each resource is indicated through combination number indication information in Part1, and the ports selected at each layer are indicated respectively through a combination number in Part2.

Third Example: CRI and Port Selection Indication

The network side device has configured K=4 CSI-RS resources for transmitting the beam-formed CSI-RSs for the terminal, and two pieces of CSI reporting are used for reporting. The terminal reports the CRI and the port selection indication information in a first mode.

First mode: the terminal reports two pieces of CSI reporting, one piece of CSI reporting including the CRI and the other including the port selection indication information.

It is presumed that the CRI in a first piece of CSI reporting indicates that K'=2 CSI-RS resources are selected by the terminal, and the port selection indication information is reported through a second piece of CSI reporting. When the ports corresponding to the K'=2 CSI-RS resources are jointly indexed, the port selection indication information is indicated in a way as mentioned in the first example. When the ports corresponding to the K'=2 CSI-RS resources are independently indexed, the port selection indication information is indicated in a way as mentioned in the second example.

One piece of CSI reporting is used by the terminal, and the CRI and the port selection indication information are reported by the terminal in a second mode.

Second mode: the CRI and the port selection indication information are reported through one piece of CSI reporting.

The port selection indication information reporting method has been described hereinabove, and the terminal will be described hereinafter in conjunction with the drawings.

Second Embodiment

As shown in FIG. 2, the present application further provides in this embodiments a terminal, which includes: a CSI-RS resource reception module 210 configured to receive a CSI-RS resource issued by a network side device, the CSI-RS resource including a plurality of CSI-RS ports; a target CSI-RS port selection module 220 configured to select a plurality of target CSI-RS ports in the plurality of CSI-RS ports; and a port indication information reporting module 230 configured to report port selection indication information to the network side device, the port selection indication information being used to indicate a port identifier of the target CSI-RS port.

Optionally, the port indication information reporting module 230 includes a port indication information reporting unit configured to report CSI to the network side device, wherein a first part or a second part of CSI carries port selection indication information in accordance with an indication mode of the port selection indication information.

Optionally, the port indication information reporting module 230 includes a first indication information reporting unit configured to, in the case that the quantity of target CSI-RS ports is equal to the quantity of ports configured by the network side device, report the port selection indication information to the network side device through the first part or the second part of the CSI.

Optionally, the port indication information reporting unit includes: a second indication information reporting unit configured to, in the case that the quantity of target CSI-RS ports is different from the quantity of ports configured by the network side device, the indication mode of the port selection indication information is a bitmap indication mode and the quantity of CSI-RS ports selected on each data transmission layer is the same, report the port selection indication information to the network side device through the first part of the CSI; or a third indication reporting unit configured to, in the case that the quantity of target CSI-RS ports is different from the quantity of ports configured by the network side device, the indication mode of the port selection indication information is a combination number indication mode and the quantity of CSI-RS ports selected on each data transmission layer is the same, report the port selection indication information to the network side device through the second part of the CSI, and report the quantity of target ports to the network side device through the first part of the CSI, the quantity of target ports being the quantity of target CSI-RS ports.

Optionally, the port indication information reporting unit includes: a fourth indication information reporting unit configured to, in the case that the quantity of target CSI-RS ports is different from the quantity of ports configured by the network side device, the quantity of CSI-RS ports selected on each data transmission layer is different and the indication mode of the port selection indication information is a bitmap indication mode, report the port selection indication information to the network side device through the first part of the CSI; a fifth indication information reporting unit configured to, in the case that the quantity of target CSI-RS ports is equal to the quantity of ports configured by the network side device, the quantity of CSI-RS ports selected on each data transmission layer is the same and the indication mode of the port selection indication information is a combination number indication mode, report the port selection indication information to the network side device through the first part of the CSI; and a sixth indication information reporting unit configured to, in the case that the quantity of target CSI-RS ports is different from the quantity of ports configured by the network side device, the quantity of CSI-RS ports selected on each data transmission layer is different and the indication mode of the port selection indication information is a combination number indication mode, report the port selection indication information to the network side device through the first part of the CSI, and report the quantity of target ports to the network side device through the second part of the CSI.

Optionally, the port indication information reporting module 230 includes: a seventh indication information reporting unit configured to, in the case that the quantity of CSI-RS ports selected on each data transmission layer is the same, report the port selection indication information to the network side device through the first part of the CSI; an eighth indication information reporting unit configured to, in the case that the quantity of CSI-RS ports selected on each data transmission layer is the same, report the port selection indication information to the network side device through the second part of the CSI, and report the quantity of target ports to the network side device through the first part of the CSI; a ninth indication information reporting unit configured to, in the case that the quantity of CSI-RS ports selected on each data transmission layer is different and the indication mode of the port selection indication information is a bitmap indication mode, report the port selection indication information to the network side device through the first part of the CSI; and a tenth indication information reporting unit configured to, in the case that the quantity of CSI-RS ports selected on each data transmission layer is different and the indication mode of the port selection indication information is a combination number indication mode, report the port selection indication information to the network side device through the second part of the CSI, and report the quantity of target ports to the network side device through the first part of the CSI, the quantity of target ports being the quantity of target CSI-RS ports.

Optionally, in the case that the plurality of target CSI-RS ports belongs to at least two CSI-RS resources, the port indication information reporting module 230 includes a resource indication reporting unit configured to report the port selection indication information and/or resource indication information to the network side device, and the resource indication information is used to indicate a CSI-RS resource to which the target CSI-RS port belongs.

Optionally, the resource indication reporting unit includes: a first resource indication reporting sub-unit configured to, in the case that the CSI is reported through one piece of configured CSI reporting, report the resource indication information to the network side device through a third part of the CSI, and report the port selection indication information to the network side device through the first part or second part of the CSI; and a second resource indication reporting sub-unit configured to, in the case that the CSI is reported through at least two pieces of configured CSI reporting, report the resource indication information to the network side device through CSI for one piece of configured CSI reporting, and report the port selection indication information to the network side device through a first part or a second part of CSI for the other piece of configured CSI reporting.

Optionally, each CSI-RS resource corresponds to an interface of an antenna, and the port selection indication information is further used to indicate target CSI-RS ports in a same polarization direction.

In the embodiments of the present application, the terminal receives the CSI-RS resource including the plurality of CSI-RS ports and issued by the network side device, selects the plurality of target CSI-RS ports from the plurality of CSI-RS ports, and reports the port selection indication information to the network side device. The port selection indication information is used to indicate the port identifier of each target CSI-RS port. As a result, it is able for the network side device to determine the CSI-RS port selected by the terminal in accordance with the port identifier of the target CSI-RS port indicated through the reported port selection indication information.

It should be noted that the division of units in the embodiment of the present application is schematic, and is only a logical function division, and there may be another division manner in actual implementation. In addition, each functional unit in each embodiment of the present application may be integrated into one processing unit, each unit may exist separately and physically, or two or more units may be integrated into one unit. The above-mentioned integrated units can be implemented in the form of hardware or in the form of software functional units.

In the case that the functional units are implemented in a software form and sold or used as a separate product, they may be stored in a computer-readable medium. Based on this, the technical solutions of the present application, partial or full, or parts of the technical solutions of the present application contributing to the related art, may appear in the form of software products, which may be stored in a storage medium and include several instructions so as to enable computer equipment (a personal computer, a server or network equipment) to execute all or parts of the steps of the method according to the embodiments of the present application. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, the above-mentioned virtual device provided by the embodiment of the present application can implement all the method steps implemented by the above-mentioned method embodiment, and can achieve the same technical effect, which will not be further particularly defined herein.

The present application further provides in some embodiments a terminal, which includes a memory 320, a transceiver 310 and a processor 300. The memory 320 is configured to store therein a computer program. The transceiver 310 is configured to transmit and receive data under the control of the processor 300. The transceiver 310 is configured to receive a CSI-RS resource issued by a network side device, and the CSI-RS resource includes a plurality of CSI-RS ports. The processor 300 is configured to read a computer program in the memory, so as to select a plurality of target CSI-RS ports in the plurality of CSI-RS ports. The transceiver 310 is further configured to report port selection indication information to the network side device, and the port selection indication information is used to indicate a port identifier of the target CSI-RS port.

Optionally, when reporting the port selection indication information to the network side device, the transceiver 310 is specifically configured to report CSI to the network side device, wherein a first part or a second part of the CSI carries the port selection indication information in accordance with an indication mode of the port selection indication information.

Optionally, when reporting the port selection indication information to the network side device, the transceiver 310 is specifically configured to, in the case that the quantity of target CSI-RS ports is equal to the quantity of ports configured by the network side device, report the port selection indication information to the network side device through the first part or the second part of the CSI.

Optionally, when reporting the port selection indication information to the network side device through the first part or the second part of the CSI in accordance with the indication mode of the port selection indication information, the transceiver 310 is specifically configured to: in the case that the quantity of target CSI-RS ports is different from the quantity of ports configured by the network side device, the indication mode of the port selection indication information is a bitmap indication mode and the quantity of CSI-RS ports selected on each data transmission layer is the same, report the port selection indication information to the network side device through the first part of the CSI; or in the case that the quantity of target CSI-RS ports is different from the quantity of ports configured by the network side device, the indication mode of the port selection indication information is a combination number indication mode and the quantity of CSI-RS ports selected on each data transmission layer is the same, report the port selection indication information to the network side device through the second part of the CSI, and report the quantity of target ports to the network side device through the first part of the CSI, the quantity of target ports being the quantity of target CSI-RS ports.

Optionally, when reporting the port selection indication information to the network side device through the first part or the second part of the CSI in accordance with the indication mode of the port selection indication information, the transceiver 310 is specifically configured to: in the case that the quantity of target CSI-RS ports is different from the quantity of ports configured by the network side device, the quantity of CSI-RS ports selected on each data transmission layer is different and the indication mode of the port selection indication information is a bitmap indication mode, report the port selection indication information to the network side device through the first part of the CSI; or in the case that the quantity of target CSI-RS ports is equal to the quantity of ports configured by the network side device, the quantity of CSI-RS ports selected on each data transmission layer is the same and the indication mode of the port selection indication information is a combination number indication mode, report the port selection indication information to the network side device through the first part of the CSI; or in the case that the quantity of target CSI-RS ports is different from the quantity of ports configured by the network side device, the quantity of CSI-RS ports selected on each data transmission layer is different and the indication mode of the port selection indication information is a combination number indication mode, report the port selection indication information to the network side device through the first part of the CSI, and report the quantity of target ports to the network side device through the second part of the CSI.

Optionally, when reporting the port selection indication information to the network side device, the transceiver 310 is specifically configured to: in the case that the quantity of CSI-RS ports selected on each data transmission layer is the same, report the port selection indication information to the network side device through the first part of the CSI; or in the case that the quantity of CSI-RS ports selected on each data transmission layer is the same, report the port selection indication information to the network side device through the second part of the CSI, and report the quantity of target ports to the network side device through the first part of the CSI; or in the case that the quantity of CSI-RS ports selected on each data transmission layer is different and the indication mode of the port selection indication information is a bitmap indication mode, report the port selection indication information to the network side device through the first part of the CSI; or in the case that the quantity of CSI-RS ports selected on each data transmission layer is different and the indication mode of the port selection indication information is a combination number indication mode, report the port selection indication information to the network side device through the second part of the CSI, and report the quantity of target ports to the network side device through the first part of the CSI, the quantity of target ports being the quantity of target CSI-RS ports.

Optionally, in the case that the plurality of target CSI-RS ports belongs to at least two CSI-RS resources, when reporting the port selection indication information to the network side device, the transceiver 310 is specifically configured to report the port selection indication information and/or resource indication information to the network side device, and the resource indication information is used to indicate a CSI-RS resource to which the target CSI-RS port belongs.

Optionally, when reporting the port selection indication information and the resource indication information to the network side device, the transceiver 310 is specifically configured to: in the case that the CSI is reported through one piece of configured CSI reporting, report the resource indication information to the network side device through a third part of the CSI, and report the port selection indication information to the network side device through the first part or second part of the CSI; or in the case that the CSI is reported through at least two pieces of configured CSI reporting, report the resource indication information to the network side device through CSI for one piece of configured CSI reporting, and report the port selection indication information to the network side device through a first part or a second part of CSI for the other piece of configured CSI reporting.

Optionally, each CSI-RS resource corresponds to an interface of an antenna, and the port selection indication information is further used to indicate target CSI-RS ports in a same polarization direction.

In FIG. 3, bus architecture may include a number of buses and bridges connected to each other, so as to connect various circuits for one or more processors 300 and one or more memories 320. In addition, as is known in the art, the bus architecture may be used to connect any other circuits, such as a circuit for a peripheral device, a circuit for a voltage stabilizer and a power management circuit. A bus interface may be provided, and the transceiver 310 may consist of a plurality of elements, i.e., a transmitter and a receiver for communication with any other devices over a transmission medium. The transmission medium includes a wireless channel, a wired channel, or an optical cable. The processor 300 may take charge of managing the bus architecture as well as general processings. The memory 320 may store therein data for the operation of the processor 300.

The processor 300 may be a Central Processing Unit (CPU), an Application Specific Integrated Circuit (ASIC), a Field-Programmable Gate Array (FPGA) or a Complex Programmable Logic Device (CPLD). The processor may also use a multi-core architecture.

The processor is configured to call the computer program in the memory, so as to implement the above-mentioned method in accordance with obtained executable instructions. The processor may also be physically separated from the memory.

It should be appreciated that, the above-mentioned device provided by the embodiment of the present application can implement all the method steps implemented by the above-mentioned method embodiment, and can achieve the same technical effect, which will not be further particularly defined herein The present application further provides in some embodiments a processor-readable storage medium storing therein a computer program. The computer program is used to be executed by a processor to implement the above-mentioned method.

The processor-readable storage medium may be any available medium or data storage device capable of being accessed by a processor, which includes, but not limited to, a magnetic memory (e.g., floppy disk, hard disk, magnetic tape, or Magnetic Optical disk (MO)), an optical memory (e.g., Compact Disk (CD), Digital Video Disk (DVD), Blue-ray Disk (BD), or High-definition Versatile Disk (HVD)), or a semiconductor memory (e.g., ROM, Electrically Programmable ROM (EPROM), Electrically Erasable PROM (EEPROM), NAND flash, or Solid-State Disk (SSD)).

It should be appreciated that, the present application may be provided as a method, a system or a computer program product, so the present application may be in the form of full hardware embodiments, full software embodiments, or combinations thereof. In addition, the present application may be in the form of a computer program product implemented on one or more computer-readable storage mediums (including but not limited to disk memory, Compact Disc-Read Only Memory (CD-ROM) and optical memory) including computer-readable program codes.

The present application has been described with reference to the flow charts and/or block diagrams of the method, device (system) and computer program product according to the embodiments of the present application. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be noted that a person skilled in the art can make various changes and modifications to the present application without departing from the spirit and scope of the present application. In this way, if these changes and modifications of the present application fall within the scope of the claims of the present application and their equivalent technologies, the present application is also intended to include these changes and modifications.

What is claimed is:

1. A port indication information reporting method for a terminal, comprising:

receiving a Channel State Information Reference Signal (CSI-RS) resource issued by a network side device, the CSI-RS resource comprising a plurality of CSI-RS ports;

selecting a plurality of target CSI-RS ports in the plurality of CSI-RS ports; and reporting port selection indication information to the network side device, the port selection indication information being used to indicate port identifiers of the target CSI-RS ports, wherein the CSI-RS resource corresponds to an interface of an antenna, and the port selection indication information is further used to indicate target CSI-RS ports in a same polarization direction.

2. The port indication information reporting method according to claim 1, wherein the reporting the port selection indication information to the network side device comprises:

reporting the port selection indication information to the network side device through a first part or a second part of CSI in accordance with an indication mode of the port selection indication information.

3. The port indication information reporting method according to claim 2, wherein the reporting the port selection indication information to the network side device through the first part or the second part of the CSI in accordance with the indication mode of the port selection indication information comprises:

in the case that the quantity of target CSI-RS ports is different from the quantity of ports configured by the network side device, and the indication mode of the port selection indication information is a bitmap indication mode, and the quantity of CSI-RS ports selected on each data transmission layer is the same, reporting the port selection indication information to the network side device through the first part of the CSI; or in the case that the quantity of target CSI-RS ports is different from the quantity of ports configured by the network side device, and the indication mode of the port selection indication information is a combination number indication mode, and the quantity of CSI-RS ports selected on each data transmission layer is the same, reporting the port selection indication information to the network side device through the second part of the CSI, and reporting the quantity of target ports to the network side device through the first part of the CSI, the quantity of target ports being the quantity of target CSI-RS ports.

4. The port indication information reporting method according to claim 2, wherein the reporting the port selection indication information to the network side device through the first part or the second part of the CSI in accordance with the indication mode of the port selection indication information comprises:

in the case that the quantity of target CSI-RS ports is different from the quantity of ports configured by the network side device, and the quantity of CSI-RS ports selected on each data transmission layer is different, and the indication mode of the port selection indication information is a bitmap indication mode, reporting the port selection indication information to the network side device through the first part of the CSI; or in the case that the quantity of target CSI-RS ports is equal to the quantity of ports configured by the network side device, and the quantity of CSI-RS ports selected on each data transmission layer is the same, and the indication mode of the port selection indication information is a combination number indication mode, reporting the port selection indication information to the network side device through the first part of the CSI; or in the case that the quantity of target CSI-RS ports is different from the quantity of ports configured by the network side device, and the quantity of CSI-RS ports selected on each data transmission layer is different, and the indication mode of the port selection indication information is a combination number indication mode, reporting the port selection indication information to the network side device through the first part of the CSI, and report the quantity of target ports to the network side device through the second part of the CSI.

5. The port indication information reporting method according to claim 1, wherein the reporting the port selection indication information to the network side device comprises:

in the case that the quantity of target CSI-RS ports is equal to the quantity of ports configured by the network side device, reporting the port selection indication information to the network side device through a first part or a second part of CSI.

6. The port indication information reporting method according to claim 1, wherein the reporting the port selection indication information to the network side device comprises:

in the case that the quantity of CSI-RS ports selected on each data transmission layer is the same, reporting the port selection indication information to the network side device through the first part of the CSI; or in the case that the quantity of CSI-RS ports selected on each data transmission layer is the same, reporting the port selection indication information to the network side device through the second part of the CSI, and reporting the quantity of target ports to the network side device through the first part of the CSI; or in the case that the quantity of CSI-RS ports selected on each data transmission layer is different, and the indication mode of the port selection indication information is a bitmap indication mode, reporting the port selection indication information to the network side device through the first part of the CSI; or in the case that the quantity of CSI-RS ports selected on each data transmission layer is different and the indication mode of the port selection indication information is a combination number indication mode, reporting the port selection indication information to the network side device through the second part of the CSI, and reporting the quantity of target ports to the network side device through the first part of the CSI, the quantity of target ports being the quantity of target CSI-RS ports.

7. The port indication information reporting method according to claim 1, wherein in the case that the plurality of target CSI-RS ports belongs to at least two CSI-RS resources, the reporting the port selection indication information to the network side device comprises:

reporting the port selection indication information and/or resource indication information to the network side device, and the resource indication information is used to indicate a CSI-RS resource to which the target CSI-RS port belongs.

8. The port indication information reporting method according to claim 7, wherein the reporting the port selection indication information and the resource indication information to the network side device comprises:

in the case that the CSI is reported through one piece of configured CSI reporting, reporting the resource indication information to the network side device through a third part of the CSI, and reporting the port selection indication information to the network side device through the first part or second part of the CSI; or in the case that the CSI is reported through at least two pieces of configured CSI reporting, reporting the resource indication information to the network side device through CSI for one piece of configured CSI reporting, and reporting the port selection indication information to the network side device through a first part or a second part of CSI for the other piece of configured CSI reporting.

9. A non-transitory processor-readable storage medium storing therein a computer program, wherein the computer program is used to be executed by a processor to implement the port indication information reporting method according to claim 1.

10. A terminal, comprising a memory, a transceiver and a processor, wherein the memory is configured to store therein a computer program;

the transceiver is configured to transmit and receive data under the control of the processor, the transceiver is configured to receive a CSI-RS resource issued by a network side device, and the CSI-RS resource comprises a plurality of CSI-RS ports;

the processor is configured to read a computer program in the memory to select a plurality of target CSI-RS ports in the plurality of CSI-RS ports;

the transceiver is further configured to report port selection indication information to the network side device, and the port selection indication information is used to indicate a port identifiers of the target CSI-RS ports, wherein the CSI-RS resource corresponds to an interface of an antenna, and the port selection indication information is further used to indicate target CSI-RS ports in a same polarization direction.

11. The terminal according to claim 10, wherein when reporting the port selection indication information to the network side device, the transceiver is specifically configured to:

report the port selection indication information to the network side device through a first part or a second part of CSI in accordance with an indication mode of the port selection indication information.

12. The terminal according to claim 11, wherein when reporting the port selection indication information to the network side device through the first part or the second part of the CSI in accordance with the indication mode of the port selection indication information, the transceiver is specifically configured to:

in the case that the quantity of target CSI-RS ports is different from the quantity of ports configured by the network side device, and the indication mode of the port selection indication information is a bitmap indication mode, and the quantity of CSI-RS ports selected on each data transmission layer is the same, report the port selection indication information to the network side device through the first part of the CSI; or in the case that the quantity of target CSI-RS ports is different from the quantity of ports configured by the network side device, and the indication mode of the port selection indication information is a combination number indication mode, and the quantity of CSI-RS ports selected on each data transmission layer is the same, report the port selection indication information to the network side device through the second part of the CSI, and report the quantity of target ports to the network side device through the first part of the CSI, the quantity of target ports being the quantity of target CSI-RS ports.

13. The terminal according to claim 11, wherein when reporting the port selection indication information to the network side device through the first part or the second part of the CSI in accordance with the indication mode of the port selection indication information, the transceiver is specifically configured to:

in the case that the quantity of target CSI-RS ports is different from the quantity of ports configured by the network side device, and the quantity of CSI-RS ports selected on each data transmission layer is different, and the indication mode of the port selection indication information is a bitmap indication mode, report the port selection indication information to the network side device through the first part of the CSI; or in the case that the quantity of target CSI-RS ports is equal to the quantity of ports configured by the network side device, and the quantity of CSI-RS ports selected on each data transmission layer is the same, and the indication mode of the port selection indication information is a combination number indication mode, report the port selection indication information to the network side device through the first part of the CSI; or in the case that the quantity of target CSI-RS ports is different from the quantity of ports configured by the network side device, and the quantity of CSI-RS ports selected on each data transmission layer is different, and the indication mode of the port selection indication information is a combination number indication mode, report the port selection indication information to the network side device through the first part of the CSI, and report the quantity of target ports to the network side device through the second part of the CSI.

14. The terminal according to claim 10, wherein when reporting the port selection indication information to the network side device, the transceiver is specifically configured to:

in the case that the quantity of target CSI-RS ports is equal to the quantity of ports configured by the network side device, report the port selection indication information to the network side device through a first part or a second part of CSI.

15. The terminal according to claim 10, wherein when reporting the port selection indication information to the network side device, the transceiver is specifically configured to:

in the case that the quantity of CSI-RS ports selected on each data transmission layer is the same, report the port selection indication information to the network side device through the first part of the CSI; or in the case that the quantity of CSI-RS ports selected on each data transmission layer is the same, report the port selection indication information to the network side device through the second part of the CSI, and report the quantity of target ports to the network side device through the first part of the CSI; or in the case that the quantity of CSI-RS ports selected on each data transmission layer is different, and the indication mode of the port selection indication information is a bitmap indication mode, report the port selection indication information to the network side device through the first part of the CSI; or in the case that the quantity of CSI-RS ports selected on each data transmission layer is different, and the indication mode of the port selection indication information is a combination number indication mode, report the port selection indication information to the network side device through the second part of the CSI, and report the quantity of target ports to the network side device through the first part of the CSI, the quantity of target ports being the quantity of target CSI-RS ports.

16. The terminal according to claim 10, wherein in the case that the plurality of target CSI-RS ports belongs to at least two CSI-RS resources, when reporting the port selection indication information to the network side device, the transceiver is specifically configured to:

report the port selection indication information and/or resource indication information to the network side device, and the resource indication information is used to indicate a CSI-RS resource to which the target CSI-RS port belongs.

17. The terminal according to claim 16, wherein when reporting the port selection indication information and the resource indication information to the network side device, the transceiver is specifically configured to:

in the case that the CSI is reported through one piece of configured CSI reporting, report the resource indication information to the network side device through a third part of the CSI, and report the port selection indication information to the network side device through the first part or second part of the CSI; or in the case that the CSI is reported through at least two pieces of configured CSI reporting, report the resource indication information to the network side device through CSI for one piece of configured CSI reporting, and report the port selection indication information to the network side device through a first part or a second part of CSI for the other piece of configured CSI reporting.

* * * * *